US012107343B2

(12) United States Patent
Yang et al.

(10) Patent No.: US 12,107,343 B2
(45) Date of Patent: Oct. 1, 2024

(54) ANTENNA STRUCTURE AND MOBILE DEVICE

(71) Applicant: Wistron Corp., New Taipei (TW)

(72) Inventors: Cheng-Chieh Yang, New Taipei (TW); Chih-Ming Chen, New Taipei (TW); Po-Yu Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 354 days.

(21) Appl. No.: 17/700,136

(22) Filed: Mar. 21, 2022

(65) Prior Publication Data

US 2023/0253706 A1 Aug. 10, 2023

(30) Foreign Application Priority Data

Feb. 9, 2022 (TW) ................................ 111104696

(51) Int. Cl.

*H01Q 5/307* (2015.01)
*H01Q 1/24* (2006.01)
*H01Q 5/50* (2015.01)

(52) U.S. Cl.

CPC ............ *H01Q 5/307* (2015.01); *H01Q 1/243* (2013.01); *H01Q 5/50* (2015.01)

(58) Field of Classification Search

CPC .......... H01Q 5/307; H01Q 5/50; H01Q 1/243; H01Q 9/0421

See application file for complete search history.

(56) References Cited

U.S. PATENT DOCUMENTS 3,909,830 A * 9/1975 Campbell ................ H01Q 9/32 343/745
9,502,769 B2 * 11/2016 Tsai ....................... H01Q 5/328
2007/0018892 A1 * 1/2007 Ku ....................... H01Q 9/0421 343/702

(Continued)

FOREIGN PATENT DOCUMENTS

| | | | |
|---|---|---|---|
| CN | 2689482 Y | * | 3/2005 |
| TW | 201440316 A | | 10/2014 |
| TW | I530024 B | | 4/2016 |

OTHER PUBLICATIONS

Chinese language office action dated Aug. 23, 2022, issued in application No. TW 111104696.

*Primary Examiner* — Ernest G Tacsik

(74) *Attorney, Agent, or Firm* — McClure, Qualey & Rodack, LLP

(57) ABSTRACT

An antenna structure includes a feeding radiation element, a first radiation element, a second radiation element, a third radiation element, a fourth radiation element, a fifth radiation element, and a switch circuit. The feeding radiation element has a feeding point. The second radiation element is coupled through the first radiation element to the feeding radiation element. The third radiation element is coupled to the second radiation element. The fourth radiation element is coupled to the second radiation element. The fourth radiation element and the third radiation element extend in different directions. The fifth radiation element has a tuning point, and is coupled to the feeding radiation element. The feeding radiation element is disposed between the first radiation element and the fifth radiation element. The switch circuit selectively couples the tuning point to a ground voltage.

17 Claims, 6 Drawing Sheets

(56) References Cited

U.S. PATENT DOCUMENTS

| | | | | |
|---|---|---|---|---|
| 2007/0030197 | A1* | 2/2007 | Tsai | H01Q 5/371 343/702 |
| 2011/0037660 | A1* | 2/2011 | Cheng | H01Q 1/243 343/700 MS |
| 2014/0306859 | A1* | 10/2014 | Desclos | H01Q 5/385 343/822 |
| 2014/0340265 | A1* | 11/2014 | Vazquez | H01Q 1/243 343/702 |
| 2015/0325915 | A1* | 11/2015 | Lyu | H01Q 5/371 343/870 |
| 2018/0248264 | A1* | 8/2018 | Chen | H01Q 9/40 |
| 2020/0136251 | A1* | 4/2020 | Deng | H01Q 5/15 |
| 2020/0411994 | A1* | 12/2020 | Chen | H01Q 9/0407 |
| 2023/0028988 | A1* | 1/2023 | Li | H01Q 5/371 |

* cited by examiner

ANTENNA STRUCTURE AND MOBILE DEVICE

CROSS REFERENCE TO RELATED APPLICATIONS

This application claims priority of Taiwan Patent Application No. 111104696 filed on Feb. 9, 2022, the entirety of which is incorporated by reference herein.

BACKGROUND OF THE INVENTION

Field of the Invention

The disclosure generally relates to an antenna structure, and more particularly, it relates to a wideband antenna structure.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHZ, 1800 MHZ, 1900 MHZ, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

Antennas are indispensable elements for wireless communication. If an antenna used for signal reception and transmission has a narrow operational bandwidth, it will negatively affect the communication quality of the mobile device. Accordingly, it has become a critical challenge for designers to design a wideband antenna structure with a small size.

BRIEF SUMMARY OF THE INVENTION

In an exemplary embodiment, the disclosure is directed to an antenna structure that includes a feeding radiation element, a first radiation element, a second radiation element, a third radiation element, a fourth radiation element, a fifth radiation element, and a switch circuit. The feeding radiation element has a feeding point. The second radiation element is coupled through the first radiation element to the feeding radiation element. The third radiation element is coupled to the second radiation element. The fourth radiation element is coupled to the second radiation element. The fourth radiation element and the third radiation element extend in different directions. The fifth radiation element has a tuning point, and is coupled to the feeding radiation element. The feeding radiation element is disposed between the first radiation element and the fifth radiation element. The switch circuit selectively couples the tuning point to a ground voltage.

In some embodiments, the first radiation element is substantially perpendicular to the feeding radiation element.

In some embodiments, the second radiation element is neither parallel to the first radiation element nor perpendicular to the first radiation element.

In some embodiments, the third radiation element substantially has a relatively long L-shape.

In some embodiments, the third radiation element includes a first segment and a second segment which are perpendicular to each other.

In some embodiments, an angle is formed between the first segment and the second radiation element.

In some embodiments, the angle is from 0 to 90 degrees.

In some embodiments, the fourth radiation element and the first segment are substantially arranged in the same straight line.

In some embodiments, the fifth radiation element substantially has a relatively short L-shape.

In some embodiments, the antenna structure covers a first frequency band, a second frequency band, and a third frequency band.

In some embodiments, the first frequency band is from 699 MHz to 894 MHz, the second frequency band is from 1710 MHz to 2000 MHz, and the third frequency band is from 2100 MHz to 2300 MHz.

In some embodiments, the total length of the feeding radiation element, the first radiation element, the second radiation element, and the third radiation element is shorter than or equal to 0.25 wavelength of the first frequency band.

In some embodiments, the total length of the feeding radiation element, the first radiation element, the second radiation element, and the fourth radiation element is shorter than or equal to 0.25 wavelength of the first frequency band.

In some embodiments, the total length of the feeding radiation element and the first radiation element is substantially equal to 0.25 wavelength of the third frequency band.

In some embodiments, the switch circuit includes a first switch element. The first switch element has a first terminal coupled to the tuning point, and a second terminal coupled to the ground voltage.

In some embodiments, the switch circuit further includes a second switch element and a first inductor. The second switch element has a first terminal coupled to the tuning point, and a second terminal coupled to an inner node. The first inductor has a first terminal coupled to the inner node, and a second terminal coupled to the ground voltage.

In some embodiments, the switch circuit further includes a second inductor. The second inductor has a first terminal coupled to the tuning point, and a second terminal coupled to the ground voltage.

In some embodiments, if the first switch element is opened and the second switch element is closed, the antenna structure will cover a first frequency interval. If the first switch element and the second switch element are both opened, the antenna structure will cover a second frequency interval.

In some embodiments, the first frequency interval is from 1710 MHz to 1850 MHz, and the second frequency interval is from 1850 MHz to 2000 MHz.

In another exemplary embodiment, the disclosure is directed to a mobile device that includes an antenna structure as mentioned above and a communication module. The communication module is coupled to the antenna structure, such that the mobile device supports wireless communication.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
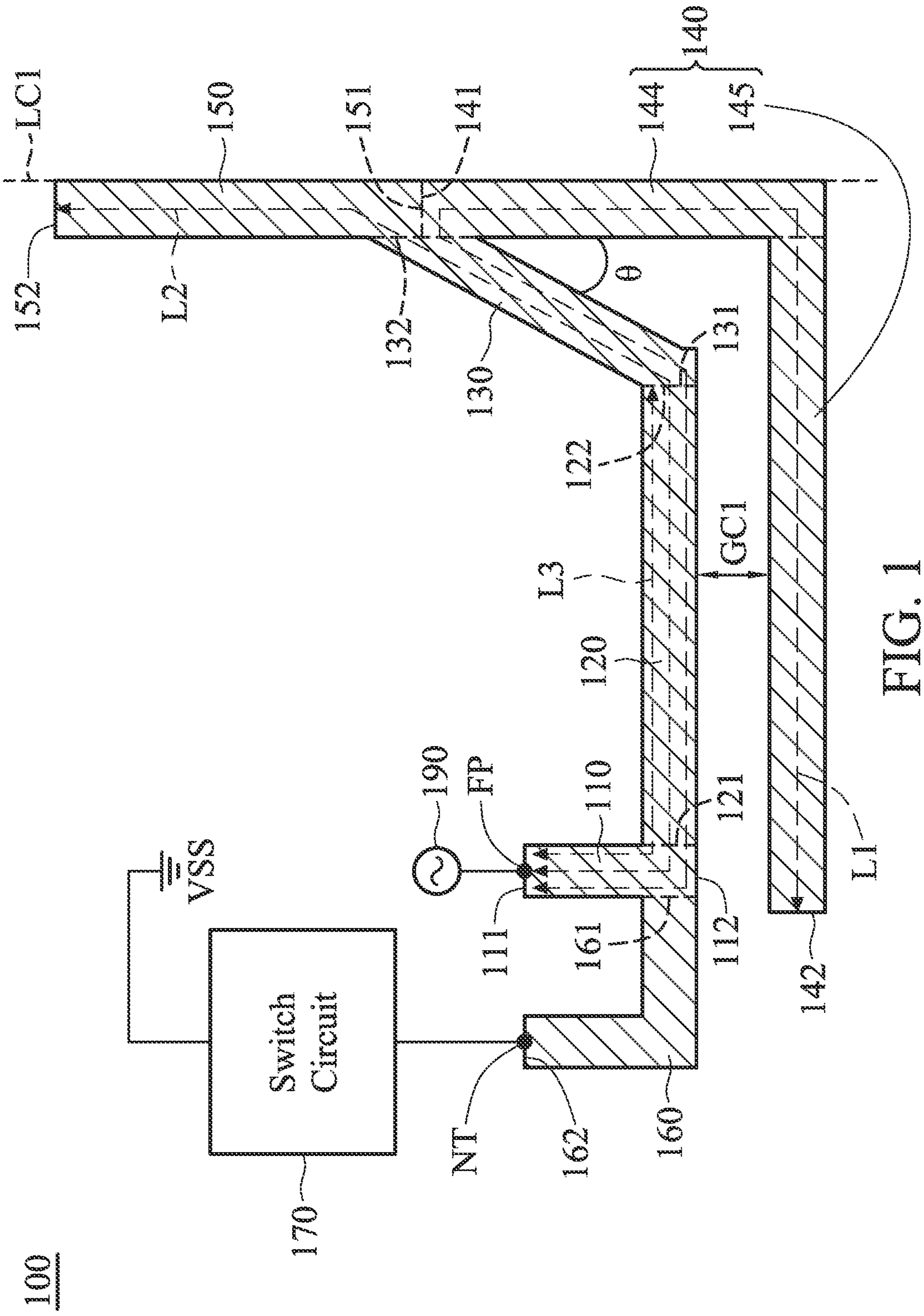
FIG. 1 is a diagram of an antenna structure according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. The antenna structure 100 may be applied to a mobile device, such as a wearable device, a smart phone, a tablet computer, or a notebook computer. Alternatively, the antenna structure 100 may be applied to an electronic device, such as any unit operating within the Internet of Things (IoT).

In the embodiment of FIG. 1, the antenna structure 100 includes a feeding radiation element 110, a first radiation element 120, a second radiation element 130, a third radiation element 140, a fourth radiation element 150, a fifth radiation element 160, and a switch circuit 170. The feeding radiation element 110, the first radiation element 120, the second radiation element 130, the third radiation element 140, the fourth radiation element 150, and the fifth radiation element 160 may all be made of metal materials, such as copper, silver, aluminum, iron, or their alloys.

The feeding radiation element 110 may substantially have a relatively short straight-line shape. Specifically, the feeding radiation element 110 has a first end 111 and a second end 112. A feeding point FP is positioned at the first end 111 of the feeding radiation element 110. The feeding point FP may be further coupled to a signal source 190. For example, the signal source 190 may be an RF (Radio Frequency) module for exciting the antenna structure 100.

The first radiation element 120 may substantially have a relatively long straight-line shape, which may be substantially perpendicular to the feeding radiation element 110. Specifically, the first radiation element 120 has a first end 121 and a second end 122. The first end 121 of the first radiation element 120 is coupled to the second end 112 of the feeding radiation element 110.

The second radiation element 130 is coupled through the first radiation element 120 to the feeding radiation element 110. Specifically, the second radiation element 130 has a first end 131 and a second end 132. The first end 131 of the second radiation element 130 is coupled to the second end 122 of the first radiation element 120. In some embodiments, the second radiation element 130 is neither parallel to the first radiation element 120, nor perpendicular to the first radiation element 120.

The third radiation element 140 may substantially have a relatively long L-shape. Specifically, the third radiation element 140 has a first end 141 and a second end 142. The first end 141 of the third radiation element 140 is coupled to the second end 132 of the second radiation element 130. The second end 142 of the third radiation element 140 is an open end. In some embodiments, the third radiation element 140 includes a first segment 144 and a second segment 145 which are substantially perpendicular to each other. The first segment 144 is adjacent to the first end 141 of the third radiation element 140. The second segment 145 is adjacent to the second end 142 of the third radiation element 140. It should be noted that the term "adjacent" or "close" over the disclosure means that the distance (spacing) between two corresponding elements is shorter than a predetermined distance (e.g., 5 mm or shorter), or it means that the two corresponding elements are touching each other directly (i.e., the aforementioned distance/spacing therebetween is reduced to 0). It should be noted that an angle θ is formed between the first segment 144 and the second radiation element 130. For example, the angle θ may be an acute angle, but it is not limited thereto. In some embodiments, the second segment 145 is substantially parallel to the first radiation element 120, and a coupling gap GC1 is formed between the second segment 145 and the first radiation element 120.

The fourth radiation element 150 may substantially have a relatively median straight-line shape. The fourth radiation element 150 and the third radiation element 140 may extend in different directions. Specifically, the fourth radiation element 150 has a first end 151 and a second end 152. The first end 151 of the fourth radiation element 150 is coupled to the second end 132 of the second radiation element 130 and the first end 141 of the third radiation element 140. The second end 152 of the fourth radiation element 150 is an open end. In some embodiment, the fourth radiation element 150 and the first segment 144 are substantially arranged in the same straight line LC1.

The fifth radiation element 160 may substantially have a relatively short L-shape. Specifically, the fifth radiation element 160 has a first end 161 and a second end 162. The first end 161 of the fifth radiation element 160 is coupled to the second end 112 of the feeding radiation element 110. A tuning point NT is positioned at the second end 162 of the fifth radiation element 160. In some embodiments, the feeding radiation element 110 is disposed between the first radiation element 120 and the fifth radiation element 160.

The switch circuit 170 can selectively couple the tuning point NT to a ground voltage VSS (e.g., 0V). In some embodiments, the ground voltage VSS is provided by a system ground plane (not shown). By using the switch circuit 170, the antenna structure 100 can cover a first frequency band, a second frequency band, and a third frequency band. For example, the first frequency band may be from 699 MHz to 894 MHz, the second frequency band may be from 1710 MHz to 2000 MHz, and the third frequency band may be from 2100 MHz to 2300 MHz, but they are not limited thereto. Accordingly, the antenna structure 100 can support at least the wideband operations of LTE (Long Term Evolution).

With respect to the antenna theory, the feeding radiation element 110, the first radiation element 120, the second radiation element 130, and the third radiation element 140 are excited to generate the aforementioned first frequency band. Moreover, the feeding radiation element 110, the first radiation element 120, the second radiation element 130, and the fourth radiation element 150 are configured to increase the bandwidth of the aforementioned first frequency band. Because of the frequency-doubling effect, the feeding radiation element 110, the first radiation element 120, the second radiation element 130, and the third radiation element 140 are further excited to generate the aforementioned second frequency band. In addition, the feeding radiation element 110 and the first radiation element 120 are excited to generate the aforementioned third frequency band. It should be understood that the fifth radiation element 160 and the switch circuit 170 are configured to fine-tune the impedance matching of the antenna structure 100 operating within the first frequency band, the second frequency band, and the third frequency band as mentioned above.

The following embodiments will introduce different circuit structures of the switch circuit 170. It should be understood that these figures and descriptions are merely exemplary, rather than limitations of the invention.

Figure 2:
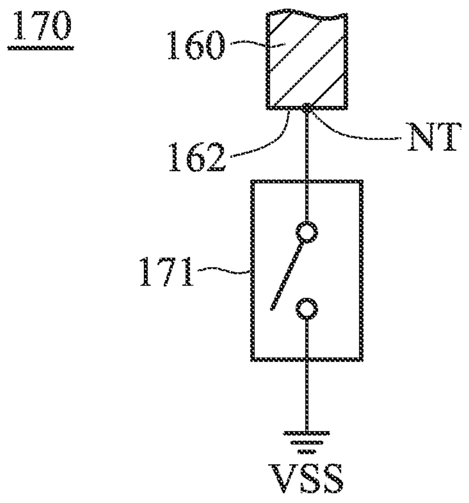
FIG. 2 is a circuit structure diagram of a switch circuit according to an embodiment of the invention.

FIG. 2 is a circuit structure diagram of the switch circuit 170 according to an embodiment of the invention. In the embodiment of FIG. 2, the switch circuit 170 includes a first switch element 171. Specifically, the first switch element 171 has a first terminal coupled to the tuning point NT of the fifth radiation element 160, and a second terminal coupled to the ground voltage VSS. For example, if the first switch element 171 is closed, the main operational frequency of the antenna structure 100 may become lower. Conversely, if the first switch element 171 is opened, the main operational frequency of the antenna structure 100 may become higher.

Figure 3:
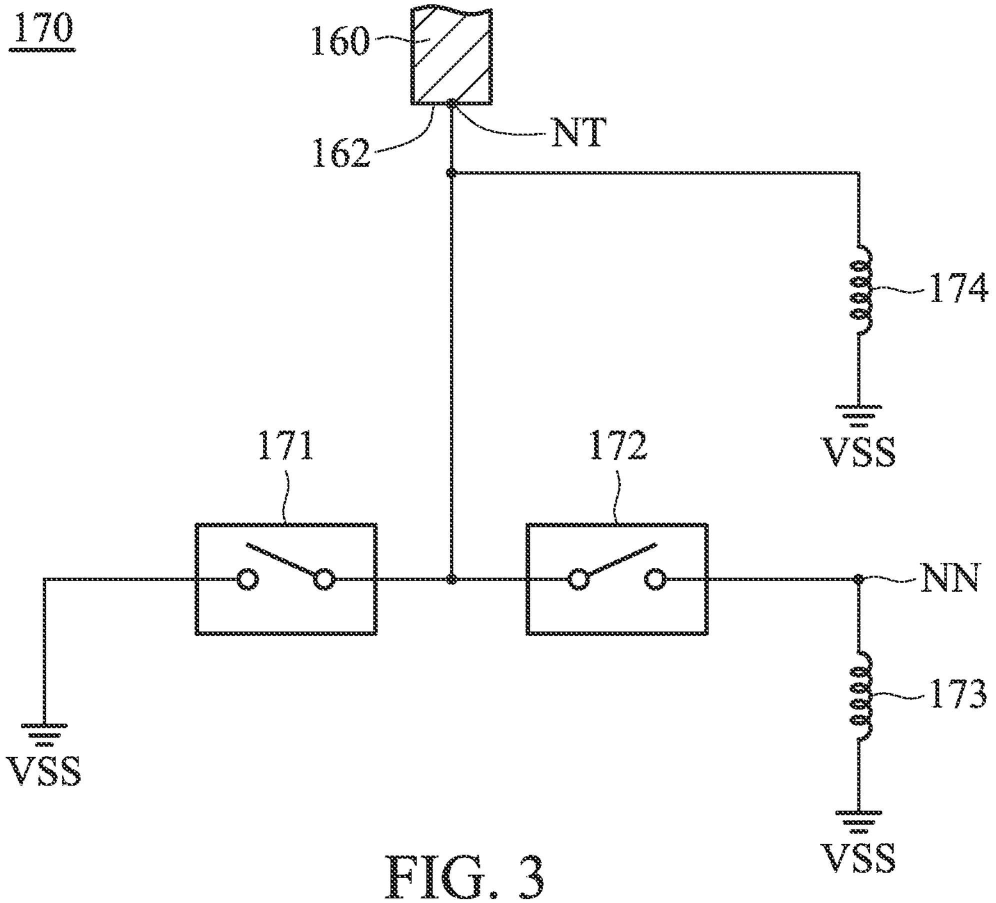
FIG. 3 is a circuit structure diagram of a switch circuit according to another embodiment of the invention.

FIG. 3 is a circuit structure diagram of the switch circuit 170 according to another embodiment of the invention. In the embodiment of FIG. 3, the switch circuit 170 includes a first switch element 171, a second switch element 172, a first inductor 173, and a second inductor 174. Specifically, the first switch element 171 has a first terminal coupled to the tuning point NT of the fifth radiation element 160, and a second terminal coupled to the ground voltage VSS. The second switch element 172 has a first terminal coupled to the tuning point NT, and a second terminal coupled to an inner node NN. The first inductor 173 has a first terminal coupled to the inner node NN, and a second terminal coupled to the ground voltage VSS. The second inductor 174 has a first terminal coupled to the tuning point NT, and a second terminal coupled to the ground voltage VSS. For example, the inductance of the second inductor 174 may be at least twice the inductance of the first inductor 173. For the high-frequency currents of the antenna structure 100, the second inductor 174 is considered as an open-circuited element.

Figure 4:
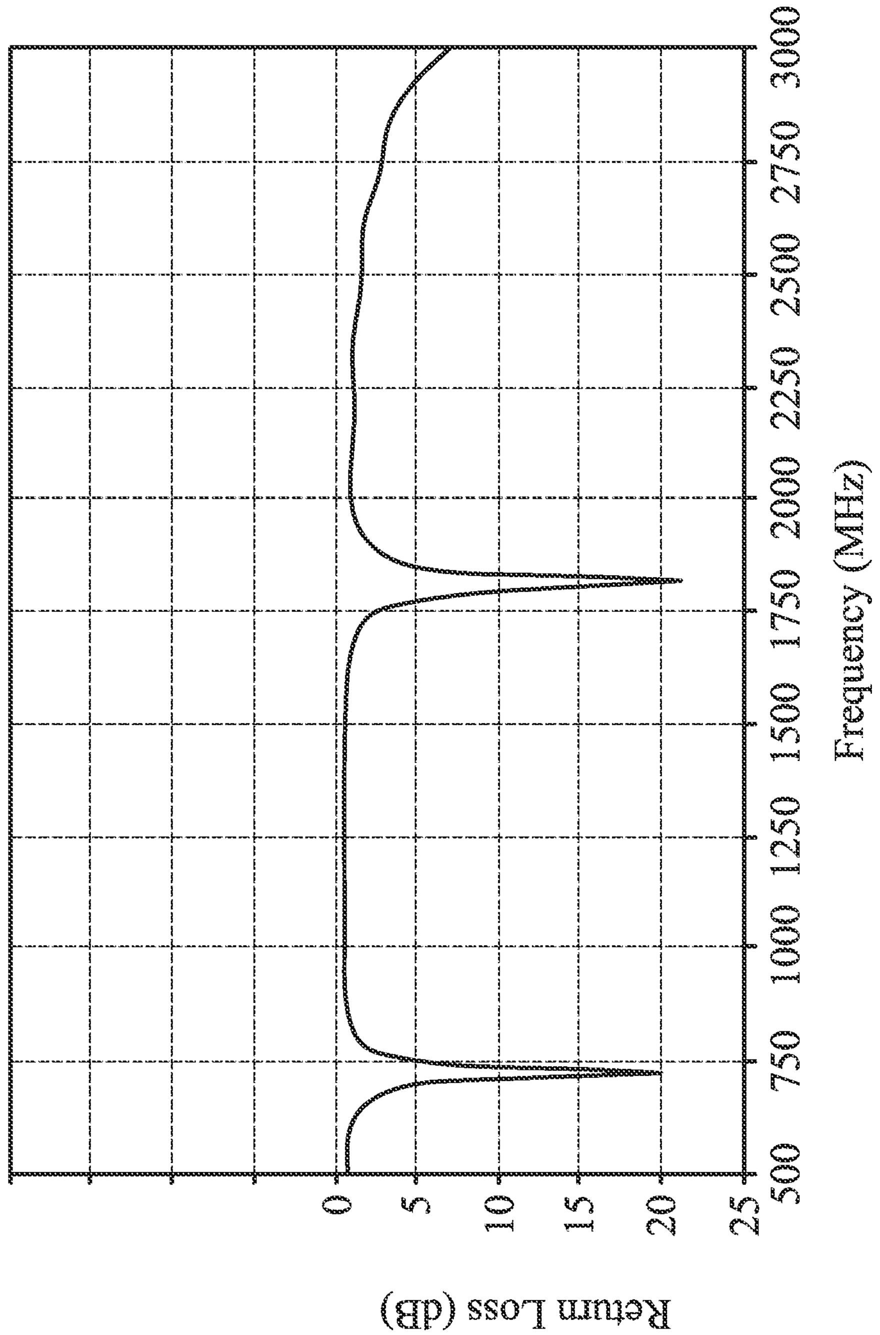
FIG. 4 is a diagram of return loss of an antenna structure according to an embodiment of the invention.

FIG. 4 is a diagram of return loss of the antenna structure 100 according to an embodiment of the invention. The horizontal axis represents the operational frequency (MHz), and the vertical axis represents the return loss (dB). In the embodiment of FIG. 4, if the first switch element 171 is closed, it will form a short-circuited path coupled between the tuning point NT and the ground voltage VSS, such that the effects of the second switch element 172, the first inductor 173, and the second inductor 174 can all be negligible. According to the measurement of FIG. 4, the antenna structure 100 can cover the relatively low first frequency band and the relatively high third frequency band.

Figure 5:
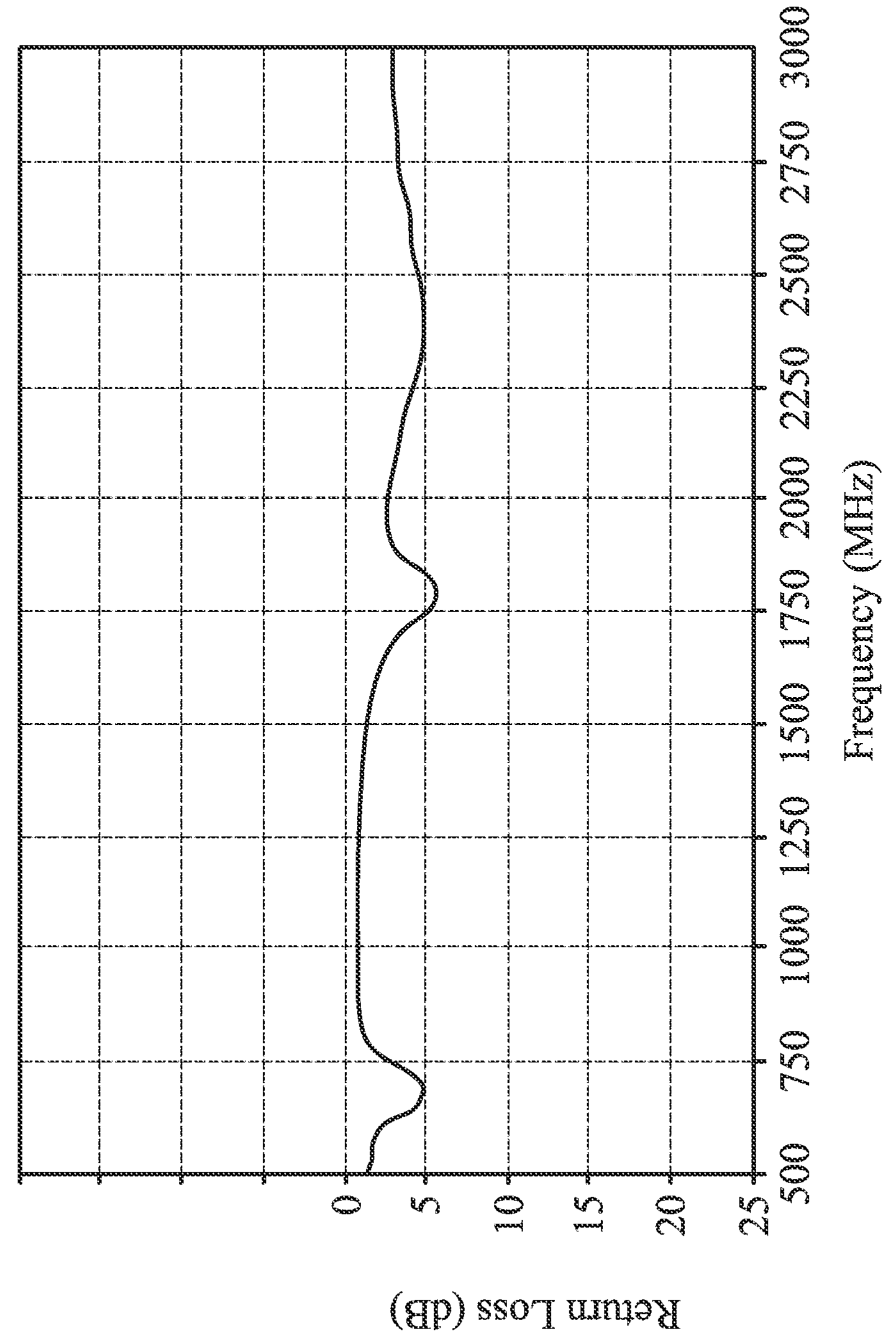
FIG. 5 is a diagram of return loss of an antenna structure according to an embodiment of the invention.

FIG. 5 is a diagram of return loss of the antenna structure 100 according to an embodiment of the invention. The horizontal axis represents the operational frequency (MHz), and the vertical axis represents the return loss (dB). In the embodiment of FIG. 5, if the first switch element 171 is opened and the second switch element 172 is closed, the antenna structure 100 will cover a first frequency interval from 1710 MHz to 1850 MHz, and it can correspond to a half portion of the second frequency band of the antenna structure 100.

Figure 6:
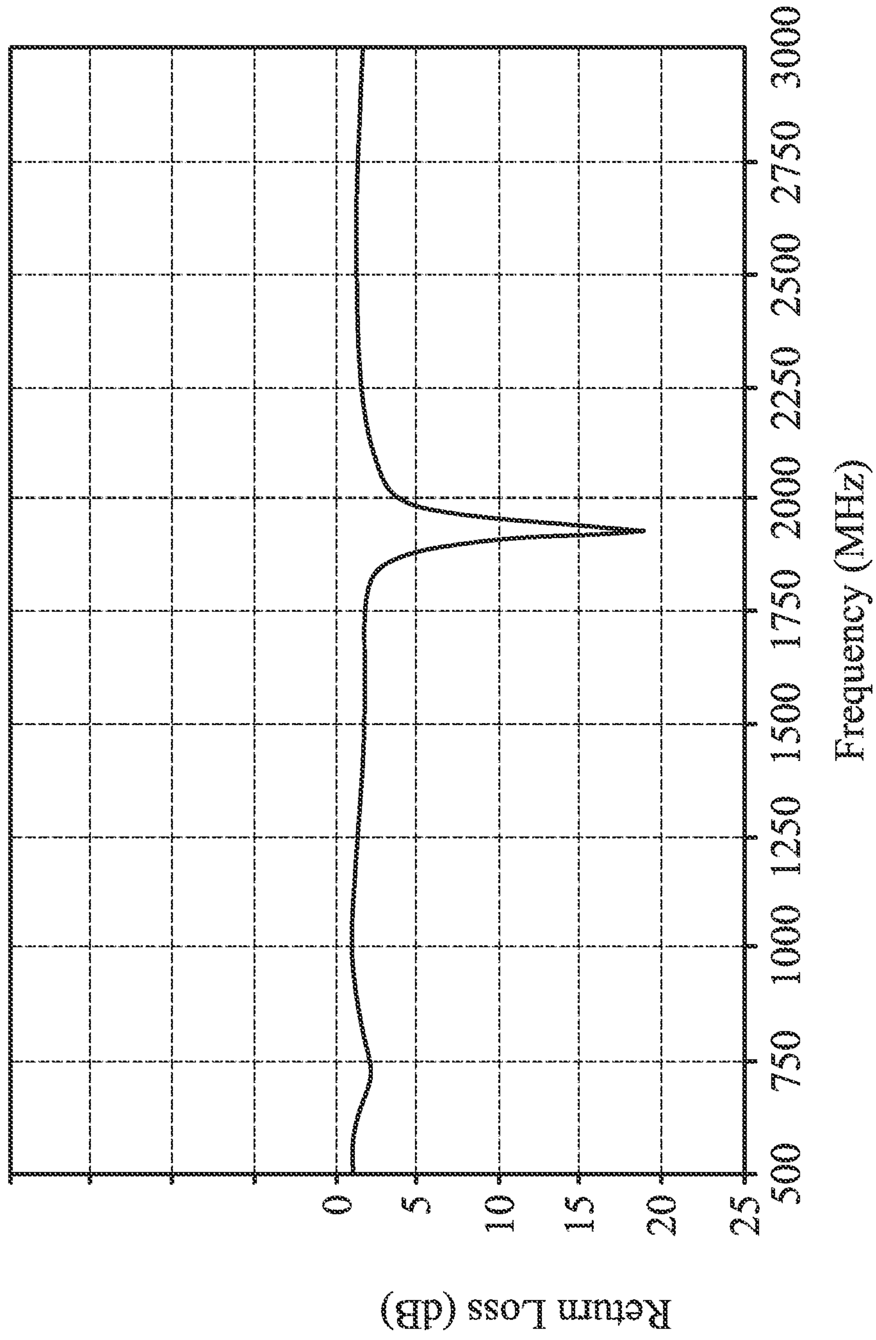
FIG. 6 is a diagram of return loss of an antenna structure according to an embodiment of the invention.

FIG. 6 is a diagram of return loss of the antenna structure 100 according to an embodiment of the invention. The horizontal axis represents the operational frequency (MHz), and the vertical axis represents the return loss (dB). In the embodiment of FIG. 6, if the first switch element 171 and the second switch element 172 are both opened, the antenna structure 100 will cover a second frequency interval from 1850 MHz to 2000 MHz, and it can correspond to another half portion of the second frequency band of the antenna structure 100.

In some embodiments, the element sizes and parameters of the antenna structure 100 will be described as follows. The total length L1 of the feeding radiation element 110, the first radiation element 120, the second radiation element 130, and the third radiation element 140 may be shorter than or equal to 0.25 (λ/4) wavelength of the first frequency band of the antenna structure 100. The total length L2 of the feeding radiation element 110, the first radiation element 120, the second radiation element 130, and the fourth radiation element 150 may be shorter than or equal to 0.25 (λ/4) wavelength of the first frequency band of the antenna structure 100. The total length L3 of the feeding radiation element 110 and the first radiation element 120 may be substantially equal to 0.25 (λ/4) wavelength of the third frequency band of the antenna structure 100. The width of each of the feeding radiation element 110, the first radiation element 120, the second radiation element 130, the third radiation element 140, the fourth radiation element 150, and the fifth radiation element 160 may be from 0.5 mm to 2 mm. The angle θ may be from 0 to 90 degrees. The width of the coupling gap GC1 may be shorter than or equal to 5 mm. The inductance of the first inductor 173 may be from 10 nH to 14 nH, such as about 12 nH. The inductance of the second inductor 174 may be from 30 nH to 36 nH, such as about 33 nH. The above ranges of element sizes and parameters are calculated and obtained according to many experimental results, and they can help to optimize the operational bandwidth and impedance matching of the antenna structure 100.

Figure 7:
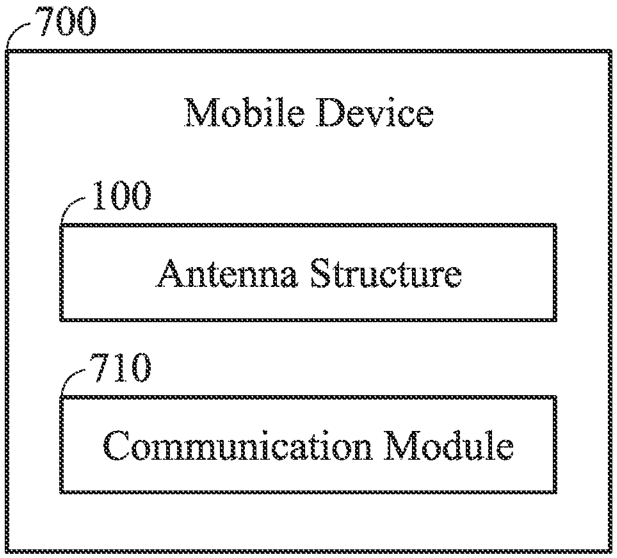
FIG. 7 is a diagram of a mobile device according to an embodiment of the invention.

FIG. 7 is a diagram of a mobile device 700 according to an embodiment of the invention. As shown in FIG. 7, the mobile device 700 includes an antenna structure 100 and a communication module 710. All of the features of the antenna structure 100 have been described in the embodiments of FIGS. 1 to 6. On the other hand, the communication module 710 is coupled to the antenna structure 100, such that the mobile device 700 can support wireless communication. For example, the communication module 710 may include a signal source, an RF circuit, a filter, an amplifier, and/or a processor, but it is not limited thereto. Other features of the mobile device 700 of FIG. 7 are similar to those of the antenna structure 100 of FIG. 1. Therefore, the two embodiments can achieve similar levels of performance.

The invention proposes a novel antenna structure and a novel electronic device and a novel mobile device. In comparison to the conventional design, the invention has at least the advantages of small size, wide bandwidth, and low manufacturing cost, and therefore it is suitable for application in a variety of mobile communication devices or IoT.

Note that the above element sizes, element shapes, and frequency ranges are not limitations of the invention. An antenna designer can fine-tune these settings or values according to different requirements. It should be understood that the antenna structure and the mobile device of the invention are not limited to the configurations of FIGS. 1-7. The invention may merely include any one or more features of any one or more embodiments of FIGS. 1-7. In other words, not all of the features displayed in the figures should be implemented in the antenna structure and the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a feeding radiation element, having a feeding point;

a first radiation element;

a second radiation element, coupled through the first radiation element to the feeding radiation element;

a third radiation element, coupled to the second radiation element;

a fourth radiation element, coupled to the second radiation element, wherein the fourth radiation element and the third radiation element extend in different directions;

a fifth radiation element, having a tuning point, and coupled to the feeding radiation element, wherein the feeding radiation element is disposed between the first radiation element and the fifth radiation element; and a switch circuit, selectively coupling the tuning point to a ground voltage;

wherein the third radiation element comprises a first segment and a second segment perpendicular to each other;

wherein an acute angle is formed between the first segment and the second radiation element;

wherein an obtuse angle is formed between the fourth radiation element and the second radiation element.

2. The antenna structure as claimed in claim 1, wherein the first radiation element is substantially perpendicular to the feeding radiation element.

3. The antenna structure as claimed in claim 1, wherein the second radiation element is neither parallel to the first radiation element nor perpendicular to the first radiation element.

4. The antenna structure as claimed in claim 1, wherein the third radiation element has a long L-shape.

5. The antenna structure as claimed in claim 1, wherein the fourth radiation element and the first segment are arranged in a same straight line.

6. The antenna structure as claimed in claim 1, wherein the fifth radiation element has a short L-shape.

7. The antenna structure as claimed in claim 1, wherein the antenna structure covers a first frequency band, a second frequency band, and a third frequency band.

8. The antenna structure as claimed in claim 7, wherein the first frequency band is from 699 MHz to 894 MHz, the second frequency band is from 1710 MHz to 2000 MHz, and the third frequency band is from 2100 MHz to 2300 MHz.

9. The antenna structure as claimed in claim 7, wherein a total length of the feeding radiation element, the first radiation element, the second radiation element, and the third radiation element is shorter than or equal to 0.25 wavelength of the first frequency band.

10. The antenna structure as claimed in claim 7, wherein a total length of the feeding radiation element, the first radiation element, the second radiation element, and the fourth radiation element is shorter than or equal to 0.25 wavelength of the first frequency band.

11. The antenna structure as claimed in claim 7, wherein a total length of the feeding radiation element and the first radiation element is equal to 0.25 wavelength of the third frequency band.

12. The antenna structure as claimed in claim 1, wherein the switch circuit comprises:

a first switch element, wherein the first switch element has a first terminal coupled to the tuning point, and a second terminal coupled to the ground voltage.

13. The antenna structure as claimed in claim 12, wherein the switch circuit further comprises:

a second switch element, wherein the second switch element has a first terminal coupled to the tuning point, and a second terminal coupled to an inner node; and a first inductor, wherein the first inductor has a first terminal coupled to the inner node, and a second terminal coupled to the ground voltage.

14. The antenna structure as claimed in claim 13, wherein the switch circuit further comprises:

a second inductor, wherein the second inductor has a first terminal coupled to the tuning point, and a second terminal coupled to the ground voltage.

15. The antenna structure as claimed in claim 14, wherein if the first switch element is opened and the second switch element is closed, the antenna structure covers a first frequency interval, and if the first switch element and the second switch element are both opened, the antenna structure covers a second frequency interval.

16. The antenna structure as claimed in claim 15, wherein the first frequency interval is from 1710 MHz to 1850 MHz, and the second frequency interval is from 1850 MHz to 2000 MHz.

17. A mobile device, comprising:

an antenna structure as claimed in claim 1; and a communication module, coupled to the antenna structure, such that the mobile device supports wireless communication.

* * * * *